United States Patent
Toda et al.

(10) Patent No.: US 9,163,160 B2
(45) Date of Patent: *Oct. 20, 2015

(54) AQUEOUS INK FOR INKJET, INK CARTRIDGE, AND INKJET RECORDING DEVICE

(71) Applicant: RICOH COMPANY, LTD., Tokyo (JP)

(72) Inventors: Naohiro Toda, Kanagawa (JP);
Tomohiro Nakagawa, Kanagawa (JP);
Hidefumi Nagashima, Kanagawa (JP);
Juichi Furukawa, Kanagawa (JP);
Ichiroh Fujii, Kanagawa (JP); Kiyofumi Nagai, Tokyo (JP)

(73) Assignee: RICOH COMPANY, LTD., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 14/482,134

(22) Filed: Sep. 10, 2014

(65) Prior Publication Data
US 2015/0077482 A1    Mar. 19, 2015

(30) Foreign Application Priority Data
Sep. 17, 2013 (JP) .................................. 2013-191672

(51) Int. Cl.
| | |
|---|---|
| *G01D 11/00* | (2006.01) |
| *C09D 175/04* | (2006.01) |
| *C09D 11/36* | (2014.01) |
| *C08K 5/06* | (2006.01) |
| *C08K 5/053* | (2006.01) |
| *C08K 5/09* | (2006.01) |

(52) U.S. Cl.
CPC .............. *C09D 175/04* (2013.01); *C08K 5/053* (2013.01); *C08K 5/06* (2013.01); *C08K 5/09* (2013.01); *C09D 11/36* (2013.01)

(58) Field of Classification Search
CPC ...... C09D 11/40; C09D 11/30; C09D 11/322; C09D 11/36; B41M 5/0047
USPC ............... 347/21, 86, 95, 96, 100; 106/31.13, 106/31.27, 31.6
See application file for complete search history.

(56) References Cited

U.S. PATENT DOCUMENTS

| 2010/0302326 A1 | 12/2010 | Morohoshi et al. |
| 2012/0293582 A1 | 11/2012 | Goto et al. |
| 2012/0308785 A1 | 12/2012 | Nakagawa |
| 2012/0320133 A1 | 12/2012 | Namba et al. |

(Continued)

FOREIGN PATENT DOCUMENTS

| JP | 2004-043518 | 2/2004 |
| JP | 2004-195706 | 7/2004 |

(Continued)

OTHER PUBLICATIONS

U.S. Appl. No. 14/472,458, filed Aug. 29, 2014, Tomohiro Nakagawa, et al.

(Continued)

*Primary Examiner* — An Do
(74) *Attorney, Agent, or Firm* — Cooper & Dunham LLP

(57) ABSTRACT

Aqueous ink for inkjet contains water; a hydrosoluble organic solvent; a pigment; and a resin, wherein the hydrosoluble organic solvent contains 2,3-butane diol having meso-2,3-butane diol in an amount of 50% by weight or more in 2,3-butane diol and 2,3-butane diol accounts for 5% by weight to 40% by weight of the entire of the aqueous ink.

6 Claims, 2 Drawing Sheets

(56) References Cited

U.S. PATENT DOCUMENTS

| | | |
|---|---|---|
| 2012/0328853 A1 | 12/2012 | Matsuyama et al. |
| 2013/0002776 A1 | 1/2013 | Nagashima et al. |
| 2013/0023614 A1 | 1/2013 | Hatada et al. |
| 2013/0113860 A1 | 5/2013 | Gotou et al. |
| 2013/0194345 A1 | 8/2013 | Tamai et al. |
| 2013/0197144 A1 | 8/2013 | Katoh et al. |
| 2013/0271524 A1 | 10/2013 | Katoh et al. |
| 2014/0002539 A1 | 1/2014 | Goto et al. |
| 2014/0192112 A1 | 7/2014 | Nagashima et al. |
| 2014/0192121 A1 | 7/2014 | Bannai et al. |

FOREIGN PATENT DOCUMENTS

| | | |
|---|---|---|
| JP | 2005-220352 | 8/2005 |
| JP | 2009-067909 | 4/2009 |
| JP | 2011-094082 | 5/2011 |

OTHER PUBLICATIONS

U.S. Appl. No. 14/203,732, filed Mar. 11, 2014.
U.S. Appl. No. 14/320,859, filed Jul. 1, 2014.
U.S. Appl. No. 14/297,868, filed Jun. 6, 2014.

AQUEOUS INK FOR INKJET, INK CARTRIDGE, AND INKJET RECORDING DEVICE

CROSS-REFERENCE TO RELATED APPLICATION

This patent application is based on and claims priority pursuant to 35 U.S.C. §119 to Japanese Patent Application No. 2013-191672 on Sep. 17, 2013 in the Japan Patent Office, the entire disclosure of which is hereby incorporated by reference herein.

BACKGROUND

1. Technical Field

The present invention relates to an aqueous ink for and an ink cartridge, and an inkjet recording device.

2. Background Art

Since inkjet printers are relatively quiet, enjoy low running costs, and easily capable of printing color images, they are now widely used at home as output device of digital signals.

In recent years, inkjet technologies have been appealing in business field of, for example, display, posters, and signboards in addition to home use.

As such ink, development of inkjet technology is in progress to use solvent-based inkjet ink containing a resin dissolved in an organic solvent which is used as a vehicle, ultraviolet-curable inkjet ink using a polymerizable monomer as its main component, and aqueous ink, which is less burden on environment, for industrial use.

SUMMARY

The present invention provides an improved aqueous ink for inkjet that contains water; a hydrosoluble organic solvent; a pigment; and a resin, wherein the hydrosoluble organic solvent contains 2,3-butane diol having meso-2,3-butane diol in an amount of 50% by weight or more in 2,3-butane diol and 2,3-butane diol accounts for 5% by weight to 40% by weight of the entire of the aqueous ink.

BRIEF DESCRIPTION OF THE DRAWINGS

Various other objects, features and attendant advantages of the present invention will be more fully appreciated as the same become better understood from the detailed description when considered in connection with the accompanying drawings, in which like reference characters designate like corresponding parts throughout and wherein.

DETAILED DESCRIPTION

Figure 1:
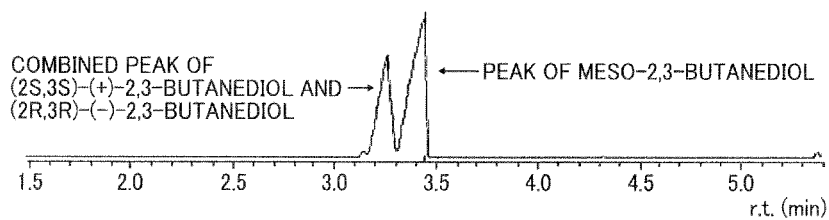
FIG. 1 is a graph illustrating the results of gas chromatography analysis of 2,3-butane diol in which the meso form accounts for 75% by weight and (2R,3R) form and (2S,3S) form account for 25% by weight.

The present invention is to provide aqueous ink for inkjet recording, which has high gloss and excellent drying property when used to print images on a non-porous substrate, into which aqueous ink is not or little permeable.

2,3-butane diol has a low boiling point and possibly improves the drying properties of ink on a substrate. It has stereoisomers referred to as diastereomers, which are the following three kinds of compounds having different structures.

(2R,3R)-(−)-2,3-butane diol is hereinafter referred to as (2R,3R) form, (2S,3S)-(+)-2,3-butane diol is hereinafter referred to as (2S,3S) form, and meso-2,3-butane diol is hereinafter referred to as meso form.

(2R,3R)-(−)-2,3-butane diol

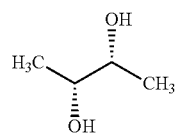

Chemical formula 1

(2S,3S)-(+)-2,3-butane diol

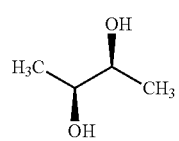

Chemical formula 2

Meso butane diol

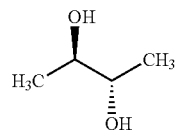

Chemical formula 3

As a result of the study about blending of 2,3-butane diol in an aqueous ink while considering the existence of the stereoisomers, it was found that the present inventor found that the gloss of printed portions was improved by using a hydrosoluble organic solvent containing 2,3-butane diol having meso form accounting for 50% or more in 2,3-butane diol.

Thus, the present invention was made.

The mechanism of the improvement on gloss is not clear but inferentially, since the pigment particle diameter in ink tends to decrease as the ratio of meso form increases, the gloss of printed portions becomes high due to an increase of dispersability of the resin in the ink.

The following embodiment 1 of the present invention is described above in detail.

1. Aqueous ink for inkjet containing water; a hydrosoluble organic solvent; a pigment; and a resin, wherein the hydrosoluble organic solvent contains 2,3-butane diol having meso-2,3-butane diol in an amount of 50% by weight or more in 2,3-butane diol and 2,3-butane diol accounts for 5% by weight to 40% by weight of an entire of the aqueous ink.

The embodiment described above of the present disclosure includes the following 2 to 6. These are also described.

2. The aqueous ink for inkjet of 1 mentioned above, wherein the hydrosoluble organic solvent further contains at least one of 1,3-propane diol, 1,2-butane diol, or 1,3-butane diol.

3. The aqueous ink for inkjet of 1 or 2 mentioned above, wherein the resin has a volume average particle diameter of from 20 nm to 50 nm.

4. An ink cartridge having an ink container to accommodate the aqueous ink for inkjet of 1 to 3 mentioned above.

5. An inkjet recording device including the ink cartridge of 4 mentioned above; an ink discharging device to apply a stimulus to ink to discharge the ink for printing; a transfer device to transfer a recording medium; and a heater to fix droplets of ink on the recording medium.

6. The inkjet recording device of 5 mentioned above, wherein the heating temperature of the heater is set to be from 40 to 80° C.

Hydrosoluble Organic Solvent

The ink of the present disclosure contains a hydrosoluble organic solvent having 2,3-butane diol having a meso form ratio of 50% by weight or more in 2,3-butane diol. The hydrosoluble organic solvent accounts for 5% by weight to 40% by weight and preferably 10% by weight to 30% by weight in the entire ink.

To obtain 2,3-butane diol as described above, the mixing ratio of (2R,3R) form, (2S,3S) form, and meso form thereof is adjusted.

According to the gas chromatography mass analysis (GC/MS) method, it is possible to obtain the ratio of meso form in a mixture.

As an example, under the analysis conditions under which meso form is separable from (2R,3R) form and (2S,3S), the analysis result of gas chromatography of 2,3-butane diol is shown by the graph of FIG. 1 in which the ratio of the meso form is 75% by weight and the total ratio of (2R,3R) form and (2S,3S) form is 25% by weight.

The analysis tool and the analysis conditions are as follows:

GC-MS equipment: QP2010, manufactured by Shimadzu Corporation

Heater: Py 2020D, manufactured by Frontier Laboratories Ltd.

Heating temperature: 250° C.

Column: Ultra ALLOY-5, L=30 m, ID=0.25 mm, Film=0.25 μm

Column temperature rising: 50° C. (maintained for one minute) to 130° C. (temperature rising speed: 10° C./min.) to 350° C. (temperature rising speed: 20° C./min. and held for one minute)

Carrier Gas Pressure: 53.6 kPa constant

Column flowing amount: 1.0 mL/min.

Ionization method: EI method (70 eV)

Pouring mode: Split (1:100)

Mass range: m/z 29 to 700

In addition, it is preferable to add at least one of 1,3-propane diol, 1,2-butane diol, and 1,3-butane diol as hydrosoluble organic solvent to produce images with better gloss. The content of these diols in ink is preferably from 3 percent by weight to 35 percent by weight and more preferably from 5 percent by weight to 25 percent by weight.

Furthermore, another hydrosoluble organic solvent is optionally added.

Specific examples thereof include, but are not limited to, polyols such as ethylene glycol, propylene glycol, 2-methyl-2,4-pentane diol, diethylene glycol, triethylene glycol, dipropylene glycol, 1,4-butane diol, 2,2-dimethyl-1,3-propane diol, 2-methyl-1,3-propane diol, 1,2-pentane diol, 2,4-pentane diol, 1,5-pentane diol, 1,6-hexane diol, 2-ethyl-1,3-hexane diol, and 2,5-hexane diol; polyol alkyl ethers such as dipropylene glycol monomethyl ether, propylene glycol-n-butyl ether, propylene glycol-t-butyl ether, diethylene glycol methyl ether, ethylene glycol-n-propyl ether, ethylene glycol-n-butyl ether, dipropylene glycol-n-propyl ether, tripropylene glycol methyl ether, tripropylene glycol-n-propyl ether, propylene glycol phenyl ether, triethylene glycol methyl ether, triethylene glycol methyl ether, triethylene glycol ethyl ether, diethylene glycol-n-hexyl ether, and ethylene glycol phenyl ether; esters such as ethyl lactate; nitrogen-containing heterocyclic ring compounds such as N-methyl-2-pyrolidone, N-hydroxyethyl-2-pyrolidone, 2-pyrolidone, 1,3-dimethyl imidazoline, and ε-caprolactam; amides such as form amide, N-methyl formamide, N,N-dimethyl formamide; amines such as monoethanol amine, diethanol amine, triethanol amine, monoethyl amine, diethyl amine, and triethyl amine; and sulfur-containing compounds such as dimethyl sulfoxide, sulfolane, thiodiethanol, and thiodiglycol.

These may be used alone or in combination of two or more thereof.

The total amount of the hydrosoluble organic solvent in ink is preferably from 20% by weight to 70% by weight and more preferably from 30% by weight to 60% by weight.

When the total amount is 20% by weight or more, ink is not or little dried, thereby obtaining sufficient discharging stability.

In addition, when the total amount is 70% by weight or less, the ink viscosity does not become excessively high, which is advantageous for discharging.

Resin

The aqueous ink of the present disclosure contains a resin. It is preferable to add a resin in a form of resin emulsion in which the resin is dispersed in water during ink manufacturing.

There is no specific limit to the kind of resin emulsion and a suitable resin emulsion can be selected to a particular application.

Specific examples thereof include, but are not limited to, emulsions of urethane resins, polyester resins, acrylic-based resins, vinyl acetate-based resins, styrene-based resins, butadiene-based resins, styrene-butadiene-based resins, vinyl chloride-based resins, acrylic styrene-based resins, and acrylic silicone-based resins.

Of these, urethane resins and acrylic-based resins are preferable in terms of fixability and ink stability.

In addition, such a resin emulsion optionally contains a dispersant such as a surfactant. However, to obtain ink having excellent layer forming property, so-called self-emulsification type resin emulsions are preferable. If an anionic group is contained in an acid value range of from 5 mgKOH to 100 mgKOH/g, it is preferable in terms of hydrodispersability.

To impart excellent scratch resistance and chemical resistance, it is particularly preferable that the acid value ranges from 5 mgKOH to 50 mgKOH/g.

In addition, it is possible to obtain good hydrodispersion stability by using carboxylic group, sulfonic acid group, etc. as anionic group.

To introduce an anionic group into a resin, it is suitable to use a monomer having such an anionic group.

As the resin emulsion, suitable emulsions can be synthesized or are available on market.

Specific examples of the products on market include, but are not limited to, Microgel E-1002 and E-5002 (styrene-acrylic-based resin emulsions, manufactured by Nippon Paint Co., Ltd.), Voncoat 4001 (acrylic-based resin emulsion, manufactured by Dainippon Ink and Chemicals, Inc.), Voncoat 5454 (styrene-acrylic-based resin emulsion, manufactured by Dainippon Ink and Chemicals, Inc.), SAE-1014 (styrene-acrylic-based resin emulsion, manufactured by Nippon Zeon Co., Ltd.), and Salvinol SK-200 (acrylic-based resin emulsion, manufactured by Saiden Chemical Industry Co., Ltd.), Primal AC-22 and AC-61 (acrylic-based resin emulsions, manufactured by The Dow Chemical Company), NANOCRYL SBCX-2821 and 3689 (acrylic-silicone-based resin emulsions, manufactured by Toyo Ink Co., Ltd.), and #3070 (methyl methacrylate polymer resin emulsion, manufactured by MIKUNI COLOR LTD.).

In addition, with regard to the particle diameter of a resin, considering using it in an inkjet recording device in particular, the volume average particle diameter is preferably from 10 nm to 1,000 nm and more preferably from 20 nm to 50 nm.

Using a resin having a volume average particle diameter of from 20 nm to 50 nm, the contact area of the surface of a dispersed resin and meso-2,3-butane diol is increased, thereby boosting the dispersability of the resin. As a result, the smoothness of a formed ink layer becomes improved so that further better gloss is obtained.

The volume average particle diameter can be measured by using a particle size analyzer (Microtrac MODEL UPA 9340, manufactured by Nikkiso Co., Ltd.).

The content of the resin in ink is preferably from 1% by weight to 10% by weight in terms of fixing property and ink stability and more preferably from 5% by weight to 10% by weight in terms of smoothness of ink layer, gloss, and fixability of a substrate.

In addition, if the content of the resin in ink is not less than the content of a pigment, preferably double or more, it is possible to obtain better gloss and high scratch resistance.

Pigment

Inorganic pigments and organic pigments can be used as pigment. Pigments having affinity with a hydrosoluble organic solvent are preferable.

As the inorganic pigments, in addition to titanium oxide, iron oxide, calcium oxide, barium sulfate, aluminum hydroxide, barium yellow, cadmium red, and chrome yellow, carbon black manufactured by known methods such as contact methods, furnace methods, and thermal methods can be used.

As the organic pigments, azo pigments (azo lakes, insoluble azo pigments, condensed azo pigments, chelate azo pigments, etc.), polycyclic pigments (phthalocyanine pigments, perylene pigments, perinone pigments, anthraquinone pigments, quinacridone pigments, dioxazine pigments, indigo pigments, thioindigo pigments, isoindolinone pigments, and quinofuranone pigments, etc.), dye chelates (basic dye type chelates, acid dye type chelates), nitro pigments, nitroso pigments, and aniline black can be used.

Preferred specific examples of the black pigments include, but are not limited to, carbon black (C.I. Pigment Black 7) such as furnace black, lamp black, acetylene black, and channel black, metals such as copper, iron (C.I. Pigment Black 11), and titanium oxides, and organic pigments such as aniline black (C.I. Pigment Black 1).

Preferred specific examples of the pigments for color include, but are not limited to, C.I. Pigment Yellow 1, 3, 12, 13, 14, 17, 24, 34, 35, 37, 42 (yellow iron oxide), 53, 55, 81, 83, 95, 97, 98, 100, 101, 104, 108, 109, 110, 117, 120, 138, 150, and 153; C.I. Pigment Orange 5, 13, 16, 17, 36, 43, and 51; C.I. Pigment Red 1, 2, 3, 5, 17, 22, 23, 31, 38, 48:2, 48:2 {Permanent Red 2B(Ca)}, 48:3, 48:4, 49:1, 52:2, 53:1, 57:1 (Brilliant Carmine 6B), 60:1, 63:1, 63:2, 64:1, 81, 83, 88, 101 (rouge), 104, 105, 106, 108 (Cadmium Red), 112, 114, 122 (Quinacridone Magenta), 123, 146, 149, 166, 168, 170, 172, 177, 178, 179, 185, 190, 193, 209, and 219; C.I. Pigment Violet 1 (Rohdamine Lake), 3, 5:1, 16, 19, 23, and 38; C.I. Pigment Blue 1, 2, 15 (Phthalocyanine Blue), 15:1, 15:2, 15:3 (Phthalocyanine Blue), 16, 17:1, 56, 60, and 63; and C.I. Pigment Green 1, 4, 7, 8, 10, 17, 18, and 36.

The surface area of a pigment is preferably from about 10 $m^2/g$ to about 1,500 $m^2/g$, more preferably from about 20 $m^2/g$ to about 600 $m^2/g$, and furthermore preferably about 50 $m^2/g$ to about 300 $m^2/g$. Unless a pigment has such a desired surface area, it is suitable to reduce the size of the pigment or pulverize it by using, for example, a ball mill, a jet mill, or ultrasonic wave.

Pigments can be dispersed in ink by a known dispersion method such as a dispersion method using a surfactant or a dispersible resin, a dispersion method of coating the surface of pigments with a resin, and a dispersion method of forming self-dispersible pigments by introducing hydrophilic group into the surface of pigments.

The volume average particle diameter ($D_{50}$) of pigments in ink is preferably from 10 nm to 200 nm and more preferably from 20 nm to 150 nm. When the particle diameter surpasses 200 nm, the dispersion stability of pigments in ink tends to be worsened and in addition, the discharging stability of the ink tends to deteriorate, thereby degrading image quality such as image density. By contrast, when the volume average particle diameter is reduced to less than 10 nm, dispersion operation and classification operation become complicated, thereby making it difficult to manufacture ink economically.

The addition amount of the pigment in ink is preferably from about 0.1% by weight to about 10% by weight and more preferably from about 1% by weight to about 10% by weight. As pigment concentration increases, image density increases so that image quality is improved. However, reliability on fixability, discharging stability, and clogging tends to deteriorate.

Surface Active Agent (Surfactant)

As for the ink of the present disclosure, it is preferable to add a surfactant so as to secure wettability thereof to a recording medium. The addition amount of a surfactant to the entire of ink is preferably from 0.1% by weight to 5% by weight therein.

When the addition amount is less than 0.1% by weight, wettability to a non-porous substrate tends to be insufficient, thereby degrading image quality. When the addition amount is greater than 5% by weight, ink tends to foam, leading to occurrence of non-discharging.

An amphoteric surfactant, a nonionic surfactant, and an anionic surfactant are usable as surfactant. Considering the relation between the dispersability of a pigment and image quality, nonionic surfactants are preferable, such as polyoxyethylene alkyl phenyl ether, polyoxyethylene alkyl ester, polyoxyethylene alkyl amine, polyoxyethylene alkyl amide, polyoxyethylene propylene block polymer, sorbitan aliphatic acid esters, polyoxyethylene sorbitan aliphatic acid esters, and adducts of acetylene alcohol with ethylene oxides.

In addition, it is possible to add a fluorine-containing surfactant and/or silicone-based surfactant depending on prescription.

Other Additives

Examples of other additives added to ink include, preservatives and fungicides, corrosion inhibitors, and pH regulators.

Specific examples of preservatives and fungicides include, but are not limited to, 1,2-benzisothiazoline-3-on, sodium benzoate, dehydrosodium acetate, sodium sorbate, pentachlorophenol sodium, and 2-pyridine thiol-1-oxide sodium.

Specific examples of the corrosion inhibitors include, but are not limited to, acid sulfite, thiosodium sulfate, ammonium thiodiglycolate, diisopropyl ammonium nitrite, pentaerythritol tetranitrate, and dicyclohexyl ammonium nitrite.

There is no specific limit to the selection of pH regulators and any material that can adjust pH to a particular value without an adverse impact on prescribed ink can be used as pH regulator.

Specific examples thereof include, but are not limited to, hydroxides of alkali metal elements such as lithium hydroxide, sodium hydroxide, and potassium hydroxide; carbonates of alkali metals such as lithium carbonate, sodium carbonate, and potassium carbonate; hydroxides of quaternary ammonium, amines such as diethanol amine and triethanol amine; ammonium hydroxide, and hydroxides of quaternary phosphonium.

The ink of the present disclosure can be manufactured by adding water to the components mentioned above optionally followed by stirring and mixing.

Mixing and stirring can be conducted by a typical stirrer using a stirring wing, a magnetic stirrer, a high performance disperser, etc. However, there is no specific method required but any known method is applicable.

Inkjet Recording Device

The inkjet recording device of the present disclosure has at least an ink cartridge having container to accommodate the ink of the present disclosure, an ink discharging device to apply a stimulus to ink to discharge the ink for printing, a transfer device, and a heater to fix droplets of the ink on a recording medium (substrate).

The ink discharging device discharges ink to form an image by applying a stimulus to the ink of the present disclosure.

There is no specific limit to the ink discharging device. Any ink discharging device is appropriately selected to a particular application.

For example, various recording heads (ink discharging head) are usable. In particular, a discharging device is preferable which has a head having multiple nozzle lines and a sub-tank to accommodate ink supplied from an ink cartridge and supply the ink to the head. It is preferable that the sub-tank mentioned above has a negative pressure producing device to produce a negative pressure, an air releasing device to release air in the sub-tank, and a detector to detect whether there is ink therein by the difference of electric resistances.

The stimulus mentioned above is generated by, for example, a stimulus generating device. There is no specific limit to the selection of the kind of stimuli. Heat (temperature), pressure, vibration, and light can be suitably used.

These may be used alone or in combination of two or more thereof. Of these, heat and pressure are preferable.

Examples of the device to generate such a stimulus include a heater, a pressurization device, a piezoelectric element, a vibrator, an ultrasonic oscillator, light, etc.

Specific examples thereof include, but are not limited to, a piezoelectric actuator as the piezoelectric element, a thermal actuator that utilizes a phase change caused by film boiling of liquid using an electric heat conversion element such as a heat element, a shape-memory alloy actuator that uses the metal phase change due to temperature change, and an electrostatic actuator that uses an electrostatic force.

There is no specific limit to how the ink is discharged, which differs depending on the kind of the stimuli. For example, in a case in which "heat" is applied as a stimulus, a method can be used which includes imparting thermal energy according to recording signals to ink in a recording head by, for example, a thermal head to generate foams in the ink, thereby discharging and spraying the ink as droplets from the nozzles of the recording head due to the pressure of the foam.

In addition, in a case in which the stimulus is "pressure", for example, a method can be used in which ink is discharged and sprayed from the nozzle holes of a recording head as droplets by applying a voltage to a piezoelectric element attached to the position of a pressure room located in the ink flow path in the recording head, thereby bending the piezoelectric element, resulting in a decrease in the volume of the pressure room.

Of these, it is preferable to discharge ink by applying a voltage to a piezoelectric element. No heat is generated by the piezoelectric system, which is advantageous to discharge ink containing a resin.

This is particularly suitable to subdue clogging in nozzles when ink containing a small amount of wetting agent is used.

In addition, to prevent non-discharging of ink caused by clogging of nozzles, it is preferable to conduct false scanning by applying to a piezoelectric element a voltage above which ink is discharged.

Furthermore, before false scanning reaching an amount corresponding to one page printing, it is preferable to operate discharging ink in an ink storing portion.

In addition, it is preferable to include a scraper to scrape ink fixated on a receiver of false discharging. Using a wiper or a cutter is preferable as the scraper.

As the transfer device to transfer a recording medium (substrate), known transfer devices such as a transfer roller and a transfer belt are suitable.

In addition, as the heating device (heater) to fix droplets of ink on a substrate, one or more known heating devices can be selected to a particular application.

As the heating device, for example, devices for a forced-air heating, radiation heating, conductive heating, high frequency drying, or microwave drying are usable. Such heating devices can be built or externally installed onto a conventional inkjet printer.

The heating temperature after printing is preferably from 40° C. to 80° C. in the present disclosure. Within this range, images with good gloss and excellent fixing property can be printed.

Figure 2:
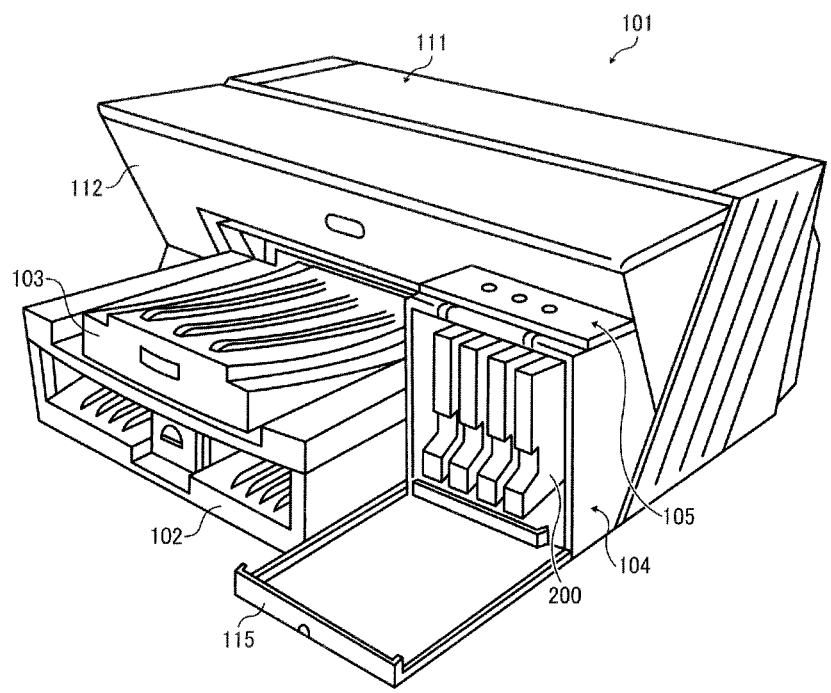
FIG. 2 is a schematic diagram illustrating an example of an inkjet recording device according to an embodiment of the present invention.

FIG. 2 is a schematic diagram illustrating an example of an inkjet recording device of the present disclosure. A serial type (shuttle type) in which a carriage scans is described in the following, but is true in a line-type inkjet recording device having a line type head.

The device illustrated in FIG. 2 is an inkjet recording device 101 having a sheet feeder tray 102 placed therein to feed recording media (substrates), a discharging tray 103 installed onto inkjet recording device 101 to store the recording media on which images are recorded (formed), and an ink cartridge loading unit 104.

On the upper surface of the ink cartridge loading unit 104 is arranged an operating unit 105 such as operation keys and a display.

The ink cartridge loading unit 104 has a front cover 115 that is openable and closable to detach and attach an ink cartridge 200.

A reference numeral 111 represents an upper cover and a reference numeral 112 represents the front surface of the front cover.

Figure 3:
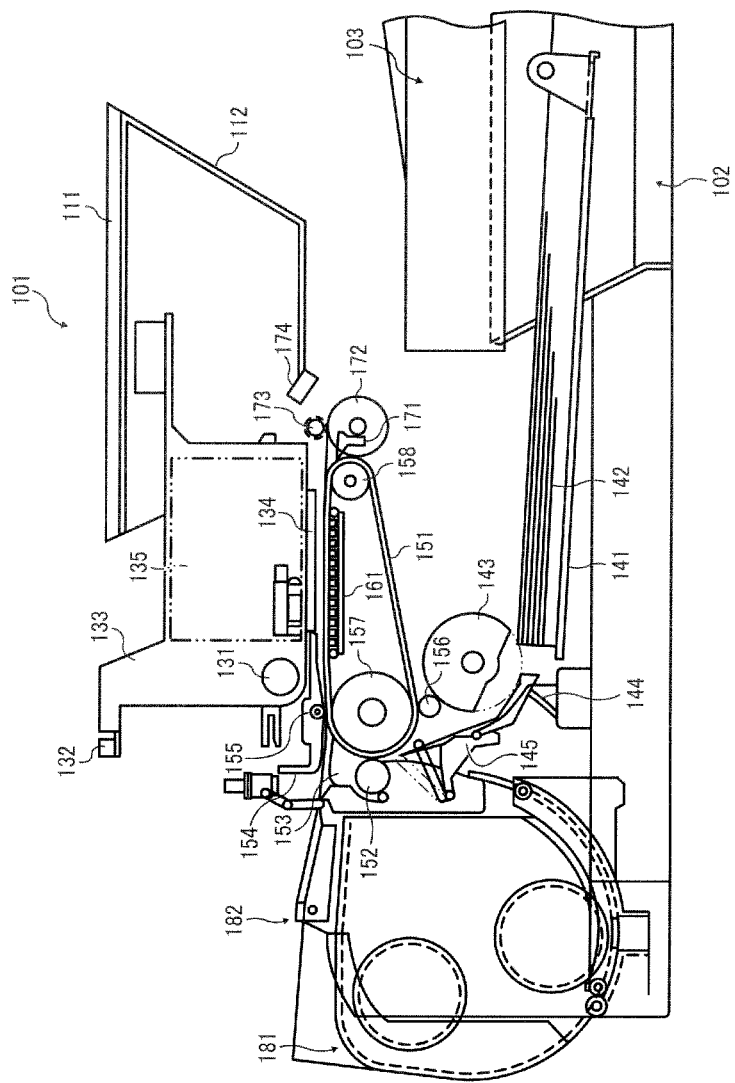
FIG. 3 is a diagram illustrating the internal structure of the inkjet recording device 101.

Inside the inkjet recording device 101, as illustrated in FIG. 3, a guide rod 131 serving as a guiding member that laterally bridges side plates provided on the right side and left side of the inkjet recording device 101 and a stay 132 hold a carriage 133 slidably movable in the main scanning direction.

A main scanning motor moves the carriage 133 for scanning.

The carriage 133 has a recording head 134 having four inkjet recording heads that discharge ink droplets of each color of yellow (Y), cyan (C), magenta (M), and black (Bk) while multiple ink discharging mouths are arranged in the direction crossing the main scanning direction with the ink droplet discharging direction downward.

As the heads for inkjet recording that form the recording head 134, it is possible to use a device having a stimulus-generating device to discharge ink such as a piezoelectric actuator such as a piezoelectric element, a thermal actuator that utilizes the phase change caused by film boiling of liquid using an electric heat conversion element such as a heat element, a shape-memory alloy actuator that uses the metal phase change due to the temperature change, and an electrostatic actuator that uses an electrostatic force.

The carriage 133 has sub tanks 135 for each color to supply each color ink to the recording head 134. The ink is supplied and replenished to the sub-tanks 135 from the ink cartridge 200 mounted onto the ink cartridge loading unit 104 via an ink supplying tube.

A sheet feeding unit to feed a substrate (recording medium, sheet) 142 loaded on a substrate loader (pressure plate) 141 of the sheet feeder tray 102 includes a half-moon shape roller (sheet feeding roller 143) to separate and feed the substrate 142 one by one from the substrate loader 141 and a separation pad 144 that is made of a material having a large friction index and arranged facing the sheet feeding roller 143 while being biased towards the sheet feeding roller 143.

A transfer unit to transfer the substrate 142 fed from the sheet feeding unit on the lower side of the recording head 134 has a transfer belt 151 to electrostatically adsorb and transfer the substrate 142, a counter roller 152 to transfer the substrate 142 fed from the sheet feeding unit via a guide 145 while pinching the substrate 142 with the transfer belt 151, a transfer guide 153 to make the substrate 142 trace on the transfer belt 151 by changing the transfer direction of the substrate 142 being sent substantially vertically upward by substantially 90°, a front end pressure roller 155 biased towards the transfer belt 151 by a pressure member 154, and a charging roller 156 to charge the surface of the transfer belt 151.

The transfer belt 151 has an endless form, stretched between a transfer roller 157 and a tension roller 158 and is rotatable in the belt transfer direction.

This transfer belt 151 has, for example, a top layer serving as a sheet adsorption surface made of a resin material such as a copolymer (ETFE) of tetrafluoroethylene and ethylene with no resistance treatment having a thickness about 40 µm, and a bottom layer (intermediate resistance layer, earth layer) made of the same material as that for the top layer with resistance treatment with carbon.

On the rear side of the transfer belt 151, a guiding member 161 arranged corresponding to the printing area by the recording head 134.

A discharging unit to discharge the substrate 142 on which images are recorded by the recording head 134 includes a separation claw 171 to separate the substrate 142 from the transfer belt 151, a discharging roller 172, and a discharging roller 173.

The substrate 142 is dried by heat wind by a fun heater 174 and thereafter output to a discharging tray 103 arranged below the discharging roller 172.

A duplex printing sheet feeding unit 181 is detachably attached to the rear side of the inkjet recording device 101.

The duplex printing sheet feeding unit 181 takes in and reverses the substrate 142 that is returned by the reverse rotation of the transfer belt 151 and feeds it again between the counter roller 152 and the transfer belt 151.

A manual sheet feeding unit 182 is provided on the upper surface of the duplex printing sheet feeding unit 181

In this inkjet recording device, the substrate 142 is separated and fed from the sheet feeding unit one by one substantially vertically upward, guided by the guide 145, and transferred while being pinched between the transfer belt 151 and the counter roller 152.

Furthermore, the front end is guided by the transfer guide 153 and pressed against the transfer belt 151 by the front end pressure roller 155 to change the transfer direction substantially 90°.

Since the transfer belt 151 is charged by the charging roller 156 at this point in time, the substrate 142 is electrostatically adsorbed to the transfer belt 151 and transferred.

By driving the recording head 134 according to the image signal while moving the carriage 133, ink droplets are discharged to the substrate 142 not in motion to record an image for an amount corresponding to one line and thereafter the substrate 142 is transferred in a predetermined amount to conduct recording for the next line.

On receiving a signal indicating that the recording has completed or the rear end of the substrate 142 has reached the image recording area, the recording operation stops and the substrate 142 is discharged to the discharging tray 103.

The substrate on which images are printed by the inkjet recording device of the present disclosure is preferably a non-porous substrate.

The non-porous substrate is, for example, laminate paper, coated paper, or a resin film having a surface formed of a plastic material such as transparent or colored vinyl chloride film, polyethylene terephthalate (PET), acrylic film, polypropylene film, polyimide film, and polystyrene film, without containing paper components such as wood pulp paper, Japanese paper, synthesized pulp paper, and synthesized fiber paper in the surface.

The inkjet recording device of the present disclosure can be applied to recording systems employing inkjet recording system such as printers, facsimile machines, photocopiers, multi-functional machines (printer/facsimile/photocopier) for inkjet recording in particular.

Having generally described preferred embodiments of this invention, further understanding can be obtained by reference to certain specific examples which are provided herein for the purpose of illustration only and are not intended to be limiting. In the descriptions in the following examples, the numbers represent eight ratios in parts, unless otherwise specified.

EXAMPLES

Next, the present disclosure described in detail with reference to Examples and Comparative Examples but not limited thereto. "%" in Examples represent "% by weight".

Example 1

Preparation of Pigment Liquid Dispersion X

After preliminarily mixing the following recipe, a pigment liquid dispersion X was obtained by conducting circulation dispersion for seven hours by a disc-type head mill (KDL type, manufactured by SHINMARU ENTERPRISES CORPORATION; Media: zirconia ball having a diameter of 0.3 mm).

| Carbon black pigment (Mitsubishi Carbon Black #2300, manufactured by Mitsubishi Chemical Corporation): | 15% |
|---|---|
| Anionic surfactant (Pionine A-51-B, manufactured by TAKEMOTO OIL & FAT Co., Ltd.): | 2% |
| Water: | 83% |

The following recipe containing the pigment liquid dispersion 1 was mixed and stirred and thereafter filtrated by a polypropylene filter of 0.2 μm to prepare ink.

| Pigment liquid dispersion X: | 20% |
|---|---|
| Aqueous polyurethane resin emulsion (HYDRAN HW-340, solid portion: 25%, solvent: water, volume average particle diameter: 35 nm, manufactured by DIC Corporation): | 24% |
| Surfactant $CH_3(CH_2)_{12}O(CH_2CH_2O)_3CH_2COOH$: | 2% |
| Meso-2,3-butane diol: | 30% |
| Diethylene glyeol-n-butyl ether: | 10% |
| Water: | 13.9% |
| Preservatives and fungicides (PROXEL LV, manufactured by AVECIA GROUP): | 0.1% |

Example 2

Ink was manufactured in the same manner as in Example 1 except that the ink recipe was changed to the following:

| Pigment liquid dispersion X: | 20% |
|---|---|
| Aqueous polyurethane resin emulsion (HYDRAN HW-340, solid portion: 25%, solvent: water, volume average particle diameter: 35 nm, manufactured by DIC Corporation): | 24% |
| Surfactant $CH_3(CH_2)_{12}O(CH_2CH_2O)_3CH_2COOH$: | 2% |
| Meso-2,3-butane diol: | 20% |
| (2R,3R)-(−)-2,3-butane diol: | 10% |
| Diethylene glycol-n-butyl ether: | 12% |
| Water: | 11.9% |
| Preservatives and fungicides (PROXEL LV, manufactured by AVECIA GROUP): | 0.1% |

Example 3

Ink was manufactured in the same manner as in Example 1 except that the ink recipe was changed to the following:

| Pigment liquid dispersion X: | 20% |
|---|---|
| Aqueous polyurethane resin emulsion (HYDRAN HW-340, solid portion: 25%, solvent: water, volume average particle diameter: 35 nm, manufactured by DIC Corporation): | 24% |
| Surfactant $CH_3(CH_2)_{12}O(CH_2CH_2O)_3CH_2COOH$: | 2% |
| Meso-2,3-butane diol: | 20% |
| (2S,3S)-(+)-2,3-butane diol: | 10% |
| Diethylene glycol-n-butyl ether: | 12% |
| Water: | 11.9% |
| Preservatives and fungicides (PROXEL LV, manufactured by AVECIA GROUP): | 0.1% |

Example 4

Ink was manufactured in the same manner as in Example 1 except that the ink recipe was changed to the following:

| Pigment liquid dispersion X: | 20% |
|---|---|
| Aqueous polyurethane resin emulsion (HYDRAN HW-340, solid portion: 25%, solvent: water, volume average particle diameter: 35 nm, manufactured by DIC Corporation): | 24% |
| Surfactant $CH_3(CH_2)_{12}O(CH_2CH_2O)_3CH_2COOH$: | 2% |
| Meso-2,3-butane diol: | 15% |
| (2R,3R)-(−)-2,3-butane diol: | 15% |
| Diethylene glycol-n-butyl ether: | 12% |
| Water: | 11.9% |
| Preservatives and fungicides (PROXEL LV, manufactured by AVECIA GROUP): | 0.1% |

Example 5

Ink was manufactured in the same manner as Example 1 except that the ink recipe was changed to the following:

| Pigment liquid dispersion X: | 20% |
|---|---|
| Aqueous polyurethane resin emulsion (HYDRAN HW-340, solid portion: 25%, solvent: water, volume average particle diameter: 35 nm, manufactured by DIC Corporation): | 24% |
| Surfactant $CH_3(CH_2)_{12}O(CH_2CH_2O)_3CH_2COOH$: | 2% |
| Meso-2,3-butane diol: | 15% |
| (2S,3S)-(+)-2,3-butane diol: | 15% |
| Diethylene glycol-n-butyl ether: | 12% |
| Water: | 11.9% |
| Preservatives and fungicides (PROXEL LV, manufactured by AVECIA GROUP): | 0.1% |

Example 6

Ink was manufactured in the same manner as in Example 1 except that the ink recipe was changed to the following:

| Pigment liquid dispersion X: | 20% |
|---|---|
| Aqueous polyurethane resin emulsion (HYDRAN HW-340, solid portion: 25%, solvent: water, volume average particle diameter: 35 nm, manufactured by DIC Corporation): | 24% |
| Surfactant $CH_3(CH_2)_{12}O(CH_2CH_2O)_3CH_2COOH$: | 2% |
| Meso-2,3-butane diol: | 5% |
| 1,3-propane diol: | 25% |
| Diethylene glycol-n-butyl ether: | 12% |
| Water: | 11.9% |
| Preservatives and fungicides (PROXEL LV, manufactured by AVECIA GROUP): | 0.1% |

Example 7

Ink was manufactured in the same manner as in Example 1 except that the ink recipe was changed to the following:

| Pigment liquid dispersion X: | 20% |
|---|---|
| Aqueous polyurethane resin emulsion (HYDRAN HW-340, solid portion: 25%, solvent: water, volume average particle diameter: 35 nm, manufactured by DIC Corporation): | 24% |
| Surfactant $CH_3(CH_2)_{12}O(CH_2CH_2O)_3CH_2COOH$: | 2% |
| Meso-2,3-butane diol: | 10% |
| 1,3-propane diol: | 20% |
| Diethylene glycol-n-butyl ether: | 12% |
| Water: | 11.9% |
| Preservatives and fungicides (PROXEL LV, manufactured by AVECIA GROUP): | 0.1% |

Example 8

Ink was manufactured in the same manner as in Example 1 except that the ink recipe was changed to the following:

| | |
|---|---|
| Pigment liquid dispersion X: | 20% |
| Aqueous polyurethane resin emulsion (HYDRAN HW-340, solid portion: 25%, solvent: water, volume average particle diameter: 35 nm, manufactured by DIC Corporation): | 24% |
| Surfactant $CH_3(CH_2)_{12}O(CH_2CH_2O)_3CH_2COOH$: | 2% |
| Meso-2,3-butane diol: | 20% |
| 1,3-propanediol: | 10% |
| Diethylene glycol-n-butyl ether: | 12% |
| Water: | 11.9% |
| Preservatives and fungicides (PROXEL LV, manufactured by AVECIA GROUP): | 0.1% |

Example 9

Ink was manufactured in the same manner as in Example 1 except that the ink recipe was changed to the following:

| | |
|---|---|
| Pigment liquid dispersion X: | 20% |
| Aqueous polyurethane resin emulsion (HYDRAN HW-340, solid portion: 25%, solvent: water, volume average particle diameter: 35 nm, manufactured by DIC Corporation): | 24% |
| Surfactant $CH_3(CH_2)_{12}O(CH_2CH_2O)_3CH_2COOH$: | 2% |
| Meso-2,3-butane diol: | 40% |
| Diethylene glycol-n-butyl ether: | 12% |
| Water: | 1.9% |
| Preservatives and fungicides (PROXEL LV, manufactured by AVECIA GROUP): | 0.1% |

Example 10

Ink was manufactured in the same manner as in Example 1 except that the ink recipe was changed to the following:

| | |
|---|---|
| Pigment liquid dispersion X: | 20% |
| Aqueous polyurethane resin emulsion (HYDRAN HW-340, solid portion: 25%, solvent: water, volume average particle diameter: 35 nm, manufactured by DIC Corporation): | 24% |
| Surfactant $CH_3(CH_2)_{12}O(CH_2CH_2O)_3CH_2COOH$: | 2% |
| Meso-2,3-butane diol: | 20% |
| 1,2-butane diol: | 10% |
| Diethylene glycol-n-butyl ether: | 12% |
| Water: | 11.9% |
| Preservatives and fungicides (PROXEL LV, manufactured by AVECIA GROUP): | 0.1% |

Example 11

Ink was manufactured in the same manner as in Example 1 except that the ink recipe was changed to the following:

| | |
|---|---|
| Pigment liquid dispersion X: | 20% |
| Aqueous polyurethane resin emulsion (HYDRAN HW-340, solid portion: 25%, solvent: water, volume average particle diameter: 35 nm, manufactured by DIC Corporation): | 24% |
| Surfactant $CH_3(CH_2)_{12}O(CH_2CH_2O)_3CH_2COOH$: | 2% |
| Meso-2,3-butane diol: | 20% |
| 1,3-butane diol: | 10% |
| Diethylene glycol-n-butyl ether: | 12% |
| Water: | 11.9% |
| Preservatives and fungicides (PROXEL LV, manufactured by AVECIA GROUP): | 0.1% |

Example 12

Ink was manufactured in the same manner as in Example 1 except that the ink recipe was changed to the following:

| | |
|---|---|
| Pigment liquid dispersion X: | 20% |
| Aqueous polyurethane resin emulsion (HYDRAN HW-340, solid portion: 25%, solvent: water, volume average particle diameter: 35 nm, manufactured by DIC Corporation): | 36% |
| Surfactant $CH_3(CH_2)_{12}O(CH_2CH_2O)_3CH_2COOH$: | 2% |
| Meso-2,3-butane diol: | 20% |
| 1,3-propane diol: | 10% |
| Diethylene glycol-n-butyl ether: | 6.9% |
| Water: | 5% |
| Preservatives and fungicides (PROXEL LV, manufactured by AVECIA GROUP): | 0.1% |

Example 13

Ink was manufactured in the same manner as in Example 1 except that the ink recipe was changed to the following:

| | |
|---|---|
| Pigment liquid dispersion X: | 20% |
| Aqueous polyurethane resin emulsion (HYDRAN HW-340, solid portion: 25%, solvent: water, volume average particle diameter: 35 nm, manufactured by DIC Corporation): | 12% |
| Surfactant $CH_3(CH_2)_{12}O(CH_2CH_2O)_3CH_2COOH$: | 2% |
| Meso-2,3-butane diol: | 20% |
| 1,3-propane diol: | 10% |
| Diethylene glycol-n-butyl ether: | 12% |
| Water: | 23.9% |
| Preservatives and fungicides (PROXEL LV, manufactured by AVECIA GROUP): | 0.1% |

Example 14

Ink was manufactured in the same manner as in Example 1 except that the ink recipe was changed to the following:

| | |
|---|---|
| Pigment liquid dispersion X: | 20% |
| Aqueous polyurethane resin emulsion (SUPERFLEX ® 126, solid portion: 30%, solvent: water, volume average particle diameter: 20 nm, manufactured by DAI-ICHI KOGYO SEIYAKU CO., LTD.): | 20% |
| Surfactant $CH_3(CH_2)_{12}O(CH_2CH_2O)_3CH_2COOH$: | 2% |
| Meso-2,3-butane diol: | 20% |
| 1,3-propane diol: | 10% |
| Diethylene glycol-n-butyl ether: | 12% |
| Water: | 15.9% |
| Preservatives and fungicides (PROXEL LV, manufactured by AVECIA GROUP): | 0.1% |

Example 15

Ink was manufactured in the same manner as in Example 1 except that the ink recipe was changed to the following:

| | |
|---|---|
| Pigment liquid dispersion X: | 20% |
| Aqueous polyurethane resin emulsion ((SUPERFLEX ® 470, solid portion: 38%, solvent: water, volume average particle diameter: 50 nm, manufactured by DAI-ICHI KOGYO SEIYAKU CO., LTD.,): | 15.8% |
| Surfactant $CH_3(CH_2)_{12}O(CH_2CH_2O)_3CH_2COOH$: | 2% |
| Meso-2,3-butane diol: | 20% |
| 1,3-propane diol: | 10% |
| Diethylene glycol-n-butyl ether: | 12% |
| Water: | 20.1% |
| Preservatives and fungicides (PROXEL LV, manufactured by AVECIA GROUP): | 0.1% |

Example 16

Ink was manufactured in the same manner as in Example 1 except that the ink recipe was changed to the following:

| | |
|---|---|
| Pigment liquid dispersion X: | 20% |
| Aqueous polyurethane resin emulsion (SUPERFLEX ® 830 HS, solid portion: 27% solvent: water, volume average particle diameter: 10 nm, manufactured by DAI-ICHI KOGYO SEIYAKU CO., LTD.): | 22.2% |
| Surfactant $CH_3(CH_2)_{12}O(CH_2CH_2O)_3CH_2COOH$: | 2% |
| Meso-2,3-butane diol: | 20% |
| 1,3-propane diol: | 10% |
| Diethylene glycol-n-butyl ether: | 12% |
| Water: | 13.7% |
| Preservatives and fungicides (PROXEL LV, manufactured by AVECIA GROUP): | 0.1% |

Example 17

Ink was manufactured in the same manner as in Example 1 except that the ink recipe was changed to the following:

| | |
|---|---|
| Pigment liquid dispersion X: | 20% |
| Aqueous polyurethane resin emulsion (HYDRAN AP-30F, solid portion: 25%, solvent: water, volume average particle diameter: 60 nm, manufactured by DIC Corporation): | 24% |
| Surfactant $CH_3(CH_2)_{12}O(CH_2CH_2O)_3CH_2COOH$: | 2% |
| Meso-2,3-butane diol: | 20% |
| 1,3-propane diol: | 10% |
| Diethylene glycol-n-butyl ether: | 12% |
| Water: | 11.9% |
| Preservatives and fungicides (PROXEL LV, manufactured by AVECIA GROUP): | 0.1% |

Comparative Example 1

Ink was manufactured in the same manner as in Example 1 except that the ink recipe was changed to the following:

| | |
|---|---|
| Pigment liquid dispersion X: | 20% |
| Aqueous polyurethane resin emulsion (HYDRAN HW-340, solid portion: 25%, solvent: water, volume average particle diameter: 35 nm, manufactured by DIC Corporation): | 24% |
| Surfactant $CH_3(CH_2)_{12}O(CH_2CH_2O)_3CH_2COOH$: | 2% |
| Meso-2,3-butane diol: | 10% |
| (2R,3R)-(−)-2,3-butane diol: | 20% |
| Diethylene glycol-n-butyl ether: | 12% |
| Water: | 11.9% |
| Preservatives and fungicides (PROXEL LV, manufactured by AVECIA GROUP): | 0.1% |

Comparative Example 2

Ink was manufactured in the same manner as in Example 1 except that the ink recipe was changed to the following:

| | |
|---|---|
| Pigment liquid dispersion X: | 20% |
| Aqueous polyurethane resin emulsion (HYDRAN HW-340, solid portion: 25%, solvent: water, volume average particle diameter: 35 nm, manufactured by DIC Corporation): | 24% |
| Surfactant $CH_3(CH_2)_{12}O(CH_2CH_2O)_3CH_2COOH$: | 2% |
| (2R,3R)-(−)-2,3-butane diol: | 30% |
| Diethylene glycol-n-butyl ether: | 12% |
| Water: | 11.9% |
| Preservatives and fungicides (PROXEL LV, manufactured by AVECIA GROUP): | 0.1% |

Comparative Example 3

Ink was manufactured in the same manner as in Example 1 except that the ink recipe was changed to the following:

| | |
|---|---|
| Pigment liquid dispersion X: | 20% |
| Aqueous polyurethane resin emulsion (HYDRAN HW-340, solid portion: 25%, solvent: water, volume average particle diameter: 35 nm, manufactured by DIC Corporation): | 24% |
| Surfactant $CH_3(CH_2)_{12}O(CH_2CH_2O)_3CH_2COOH$: | 2% |
| Meso-2,3-butane diol: | 10% |
| (2S,3S)-(+)-2,3-butane diol: | 20% |
| Diethylene glycol-n-butyl ether: | 12% |
| Water: | 11.9% |
| Preservatives and fungicides (PROXEL LV, manufactured by AVECIA GROUP): | 0.1% |

Comparative Example 4

Ink was manufactured in the same manner as in Example 1 except that the ink recipe was changed to the following:

| | |
|---|---|
| Pigment liquid dispersion X: | 20% |
| Aqueous polyurethane resin emulsion (HYDRAN HW-340, solid portion: 25%, solvent: water, volume average particle diameter: 35 nm, manufactured by DIC Corporation): | 24% |
| Surfactant $CH_3(CH_2)_{12}O(CH_2CH_2O)_3CH_2COOH$: | 2% |
| (2S,3S)-(+)-2,3-butane diol: | 30% |
| Diethylene glycol-n-butyl ether: | 12% |
| Water: | 11.9% |
| Preservatives and fungicides (PROXEL LV, manufactured by AVECIA GROUP): | 0.1% |
| Comparative Example 5 | |

Ink was manufactured in the same manner as in Example 1 except that the ink recipe was changed to the following:

| | |
|---|---|
| Pigment liquid dispersion X: | 20% |
| Aqueous polyurethane resin emulsion (solid portion: 25%, solvent: water): (HYDRAN HW-340, volume average particle diameter: 35 nm, manufactured by DIC Corporation) | 24% |
| Surfactant $CH_3(CH_2)_{12}O(CH_2CH_2O)_3CH_2COOH$: | 2% |
| Meso-2,3-butane diol: | 2% |
| 1,3-propane diol: | 30% |
| Diethylene glycol-n-butyl ether: | 12% |
| Water: | 9.9% |
| Preservatives and fungicides (PROXEL LV, manufactured by AVECIA GROUP): | 0.1% |

Comparative Example 6

Ink was manufactured in the same manner as in Example 1 except that the ink recipe was changed to the following:

| | |
|---|---|
| Pigment liquid dispersion X: | 20% |
| Aqueous polyurethane resin emulsion (HYDRAN HW-340, solid portion: 25%, solvent: water, volume average particle diameter: 35 nm, manufactured by DIC Corporation): | 24% |
| Surfactant $CH_3(CH_2)_{12}O(CH_2CH_2O)_3CH_2COOH$: | 2% |
| Meso-2,3-butane diol: | 45% |
| Water: | 8.9% |
| Preservatives and fungicides (PROXEL LV, manufactured by AVECIA GROUP): | 0.1% |

Comparative Example 7

Ink was manufactured in the same manner as in Example 1 except that the ink recipe was changed to the following:

| | |
|---|---|
| Pigment liquid dispersion X: | 20% |
| Surfactant $CH_3(CH_2)_{12}O(CH_2CH_2O)_3CH_2COOH$: | 2% |
| Meso-2,3-butane diol: | 30% |
| Diethylene glycol-n-butyl ether: | 12% |
| Water: | 35.9% |
| Preservatives and fungicides (PROXEL LV, manufactured by AVECIA GROUP): | 0.1% |

Inks of Examples 1 to 17 and Comparative Examples 1 to 7 were subjected to the following evaluation.

The results are shown in Table 1.

Evaluation on Drying Property

An inkjet printer (remodeled based on IPSiO GXe 5500, manufactured by RICOH Co., Ltd.) having a fan to conduct heating after printing was filled with the manufactured ink.

A solid image was printed on a non-porous substrate (white vinyl chloride sheet IJ5331, manufactured by Sumitomo 3M Limited.) followed by drying at 60° C. by a heating fan to form an image.

Thereafter, filter paper was pressed against the solid portion. The drying property of the ink was evaluated based on the state of transfer of the ink to the filter paper according to the following criteria:

Evaluation Criteria

A: No transfer of ink to filter paper on drying condition of 60° C. for 15 minutes B: No transfer of ink to filter paper on drying condition of 60° C. for 30 minutes C: No transfer of ink to filter paper on drying condition of 60° C. for 60 minutes D: Transfer of ink to filter paper continuing after drying at 60° C. for 60 minutes Evaluation of Image Gloss 60° gloss of an image formed in the same manner as in Evaluation on drying property was measured by a gloss meter (4501, manufactured by BYK Gardener Inc.).

The larger the value of gloss, the better the gloss.

Evaluation on Scratch Resistance

The solid portion of an image formed in the same manner as in Evaluation on drying property was abraded by dry cotton (unbleached muslin No. 3) with a load of 400 g and the number of scratching at which the density of the solid portion is reduced by visual confirmation.

The higher the number of scratching, the more robust the image.

Example 18

An image was formed in the same manner as in evaluation on drying property except that the heating fan was off while using the ink of Example 1.

Example 19

An image was formed in the same manner as in evaluation on drying property except that the drying temperature by the heating fan was changed to 30° C. using the ink of Example 1.

Example 20

An image was formed in the same manner as in evaluation on drying property except that the drying temperature by the heating fan was changed to 40° C. using the ink of Example 1.

Example 21

An image was formed in the same manner as in evaluation on drying property except that the drying temperature by the heating fan was changed to 80° C. using the ink of Example 1.

Example 22

An image was formed in the same manner as in evaluation on drying property except that the drying temperature by the heating fan was changed to 90° C. using the ink of Example 1.

Example 23

An image was formed in the same manner as in evaluation on drying property except that the non-porous substrate (white vinyl chloride sheet IJ5331, manufactured by Sumitomo 3M Limited.) was changed to TYPE 6200 (manufactured by Ricoh Co., Ltd.) and the drying temperature by the heating fan was changed to 30° C. using the ink of Example 1.

Each image formed in Examples 18 to 23 was evaluated in the same manner as in Examples 1 to 17 with regard to drying property, scratch resistance, and ethanol resistance.

The results are shown in Table 1.

TABLE 1

| | Evaluation on drying property | Evaluation on image gloss | Evaluation on scratch resistance (# of times) | Memo |
|---|---|---|---|---|
| Example 1 | A | 105 | 87 | |
| Example 2 | A | 93 | 99 | |
| Example 3 | A | 95 | 100 | |
| Example 4 | A | 82 | 112 | |
| Example 5 | A | 81 | 112 | |
| Example 6 | B | 95 | 83 | |
| Example 7 | B | 101 | 81 | |
| Example 8 | B | 109 | 82 | |
| Example 9 | A | 103 | 90 | |
| Example 10 | B | 110 | 82 | |
| Example 11 | B | 108 | 81 | |
| Example 12 | B | 110 | 106 | |
| Example 13 | B | 102 | 74 | |
| Example 14 | B | 98 | 78 | |
| Example 15 | B | 96 | 75 | |
| Example 16 | B | 78 | 70 | |
| Example 17 | B | 71 | 71 | |
| Example 18 | C | 104 | 61 | |
| Example 19 | B | 103 | 66 | |
| Example 20 | A | 105 | 75 | |
| Example 21 | A | 104 | 99 | |

TABLE 1-continued

| | Evaluation on drying property | Evaluation on image gloss | Evaluation on scratch resistance (# of times) | Memo |
|---|---|---|---|---|
| Example 22 | A | 103 | 106 | White vinyl chloride slightly deformed by heat |
| Example 23 | A | 72 | 62 | |
| Comparative Example 1 | A | 59 | 122 | |
| Comparative Example 2 | A | 45 | 129 | |
| Comparative Example 3 | A | 57 | 123 | |
| Comparative Example 4 | A | 44 | 128 | |
| Comparative Example 5 | D | 12 | 38 | |
| Comparative Example 6 | C | 109 | 43 | |
| Comparative Example 7 | A | 23 | 12 | |

As seen in the results of Table 1, the ink of the present disclosure has excellent gloss, fixability, and image robustness. Also, the heating temperature after printing is found to be preferably from 40° C. to 80° C.

By contrast, as seen in Comparative Examples 1 to 4, when the ratio of meso-form is less than 50 the gloss of an image is worsened. In addition, as seen in Comparative Example 5, all the characteristics deteriorate when the ratio of 2,3-butane diol is small.

As seen in Comparative Example 6, scratch resistance deteriorates when the ratio of 2,3-butane diol is large.

Furthermore, as seen in Comparative Example 7, image gloss and scratch resistance are degraded when no resin is contained.

According to the present invention, an aqueous ink for inkjet recording is provided which has high gloss and excellent drying property when used to print images on a non-porous substrate, into which aqueous ink is not or little permeable.

Having now fully described embodiments of the present invention, it will be apparent to one of ordinary skill in the art that many changes and modifications can be made thereto without departing from the spirit and scope of embodiments of the invention as set forth herein.

What is claimed is:

1. Aqueous ink for inkjet recording comprising:
   water;
   a hydrosoluble organic solvent;
   a pigment; and
   a resin,
   wherein the hydrosoluble organic solvent comprises 2,3-butane diol having meso-2,3-butane diol in an amount of 50% by weight or more in 2,3-butane diol,
   wherein 2,3-butane diol accounts for 5% by weight to 40% by weight of an entire of the aqueous ink.

2. The aqueous ink for inkjet according to claim 1, wherein the hydrosoluble organic solvent further comprises at least one of 1,3-propane diol, 1,2-butane diol, or 1,3-butane diol.

3. The aqueous ink for inkjet according to claim 1, wherein the resin has a volume average particle diameter of from 20 nm to 50 nm.

4. An ink cartridge comprising:
   an ink container to accommodate the aqueous ink for inkjet of claim 1.

5. An inkjet recording device comprising:
   the ink cartridge of claim 4;
   an ink discharging device to apply a stimulus to ink to discharge the ink;
   a transfer device to transfer a recording medium; and
   a heater to fix droplets of ink on the recording medium.

6. The inkjet recording device according to claim 5, wherein a heating temperature of the heater is set to be from 40° C. to 80° C.

* * * * *